United States Patent

Meininger et al.

[11] 3,939,141
[45] Feb. 17, 1976

[54] WATER-SOLUBLE COPPER COMPLEX PHENYL AZO NAPHTHALENE REACTIVE DYESTUFFS

[75] Inventors: Fritz Meininger, Frankfurt am Main; Reinhard Hahnle, Hofheim, Taunus, both of Germany

[73] Assignee: Hoechst Aktiengesellschaft, Frankfurt am Main, Germany

[22] Filed: Jan. 3, 1974

[21] Appl. No.: 430,485

Related U.S. Application Data

[63] Continuation-in-part of Ser. No. 205,397, Dec. 6, 1971, abandoned.

[30] Foreign Application Priority Data

Dec. 7, 1970   Germany............................ 2060081

[52] U.S. Cl................................ 260/151; 260/198
[51] Int. Cl.² ............... C09B 45/18; C09B 62/44; C09B 62/74; C09B 62/82
[58] Field of Search ................................... 260/151

[56] References Cited
UNITED STATES PATENTS

| | | | |
|---|---|---|---|
| 2,657,205 | 10/1953 | Heyna et al..................... | 260/151 X |
| 3,135,730 | 6/1964 | Heyna et al...................... | 260/147 |
| 3,414,579 | 12/1968 | Remy............................. | 260/162 X |
| 3,457,251 | 7/1969 | Meininger........................ | 260/148 |

*Primary Examiner*—Floyd D. Higel
*Attorney, Agent, or Firm*—Curtis, Morris & Safford

[57] ABSTRACT

Copper containing monoazo dyestuffs of the general formula

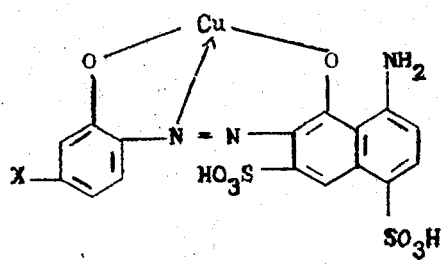

wherein X is
– $SO_2 – CH_2 – CH_2 – Z$ or
– $SO_2 – CH = CH_2$ in which Z is hydroxy or an inorganic or organic radical capable of being split off by alkaline agents. The said dyestuffs are easily soluble in water in the form of their alkali metal salts giving blue solutions which may be used for the dyeing or printing of nitrogen containing fibrous materials, materials containing hydroxyl groups or modified polyacrylonitrile fibrous materials, the dyeings obtained on wool or cellulose fibres being distinguished by high tinctorial strength and good fastness properties in general, and in particular to light, to wet processing, to weather, to chlorinated water and to hypochlorite.

4 Claims, No Drawings

WATER-SOLUBLE COPPER COMPLEX PHENYL AZO NAPHTHALENE REACTIVE DYESTUFFS

This is a continuation-in-part application of application Ser. No. 205,397 filed Dec. 6, 1971, now abandoned.

The present invention relates to novel, copper-containing monoazo dyestuffs of the general formula

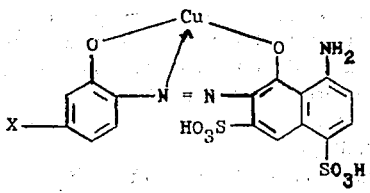

in which formula X
— $SO_2$ — $CH_2$ — $CH_2$ — Z or
— $SO_2$ — $CH = CH_2$
in which Z is hydroxy or an inorganic or organic radical capable of being split off by alkaline agents.

This invention also relates to a process for the manufacture of said monoazo dyestuffs which process comprises a a. reacting a metallizable azo compound of the formula

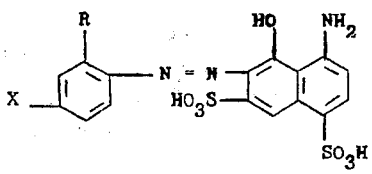

in which X is defined as above and R is hydroxyl a or a lower alkoxy, with a copper yielding agent according to known processes for the manufacture of copper complex compounds of azo dyestuffs, in a neutral or slightly acid aqueous medium at a temperature within the range of from 0° to 100°C, for example by heating an aqueous solution of the metallizable azo compound with a copper yielding agent or b. converting the dyestuff of the formula

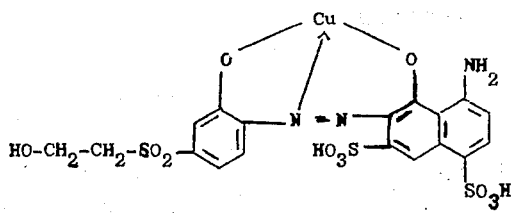

by esterification with an acid, for example concentrated sulfuric acid, sulfuric acid monohydrate, phosphoric acid or polyphosphoric acid, into the corresponding dyestuff with the grouping -$SO_2$-$CH_2$-$CH_2$-Z, in which Z is an acid radical capable of being split off by alkaline agents and, optionally, converting the dyestuff obtained by treating it with an alkaline agent into the corresponding dyestuff with the grouping —$SO_2$—$CH=CH_2$.

Suitable radicals Z which can be split off by the action of an alkaline agent are, for example, a dialkyl amino group, such as the dimethyl or diethyl amino group, the thiosulfuric acid ester group, the phosphoric acid ester group and, especially, the sulfuric acid ester group.

The copper complex dyestuffs obtained in accordance with the invention are easily soluble in water in the form of their alkali metal salts giving blue solutions which may be used for dyeing or printing different fibrous materials, especially those containing hydroxyl groups. Suitable fibrous materials are, for example, native or regenerated cellulose fibrous materials, such as cotton, staple rayon and linen. The dyestuffs of the invention are used in the presence of acid binding agents which are generally used for reactive dyestuffs in industry, such as sodium carbonate, sodium hydrogen carbonate, sodium hydroxide solution or sodium trichloroacetate.

Dyeing with the novel dyestuffs may be carried out, for example, by treating the cellulose containing textile material with an alkaline solution of the dyestuff, which may also be a printing paste, and allowing an acid binding agent, such as sodium hydroxide, sodium carbonate, sodium bicarbonate or trichloroacetic acid sodium to act on it before, during or after the treatment.

The dyestuffs are fixed on the dyed textile material by the acid binding agent and, optionally, by the action of heat, preferably at a temperature within the range of from 40° to 150°C.

In order to improve the fastness to wet processing the dyeings and prints thus obtained are subsequently thoroughly rinsed with cold and hot water, optionally in the presence of a dispersing agent.

According to methods generally used in industry the dyestuffs of the invention are also suitable for dyeing nitrogen containing fibrous materials, such as leather, silk, polyamide fibers, polyurethane fibers, regenerated protein fibers or modified polyacrylo-nitrile fibers and, especially, wool, for example, from a slightly acid, neutral or slightly alkaline bath. The pH of the dye-bath may be kept constant or may be varied during the dyeing process by adding suitable additives, for example by starting the dyeing procedure at pH 4 and increasing it during the dyeing process to 7.5.

The novel dyestuffs may also be applied on the nitrogen containing textile materials mentioned according to the printing processes generally used in practice.

The dyeings produced on cellulose fibers or on wool with the dyestuffs of the invention are distinguished by high tinctorial strength, by a very good solubility and by good stability in printing pastes. In printing processes, they yield prints which have sharp outlines and which have no tendency or only an insignificant tendency to stain or to bleed on accompanying fabrics. Dyestuff portions which are not fixed on the fibre, can be washed without difficulty.

The dyestuffs of the invention have good fastness to wet processing in general. In particular they have good fastness to light and to weather if the fabric has been subjected to a synthetic resin finish, especially to an anti-crease treatment, and also good fastness to alkali, to acid, to chlorinated water, to hypochlorite, to washing and to sea water.

As compared to the dyestuffs which have been proposed in German Patent No. 1,126,542 of closely related structure, the dyestuffs of the invention are distinguished by improved fastness to weather, to washing, to chlorinated water and to hypochlorite and especially by having a reduced tendency to smudging on accompanying fabrics in dyeing or printing of cotton materials.

The following Examples illustrate the invention. The parts and percentages are by weight unless stated otherwise.

EXAMPLE 1

250 Parts of crystallized copper sulfate were added to a neutral solution of 627 parts of the dyestuff of formula

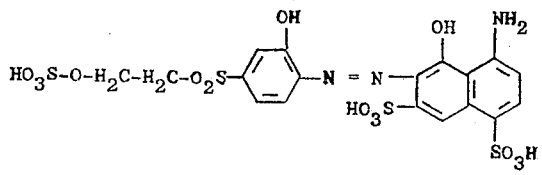

in 8,000 parts of water. The mixture was stirred at room temperature for 20 minutes and adjusted pH 5.8 with about 100 parts of anhydrous sodium carbonate. The solution obtained was vaporized at 60°C in vacuo. A black powder was obtained which was dissolved in water giving a blue solution. The dyestuff so obtained was of the formula

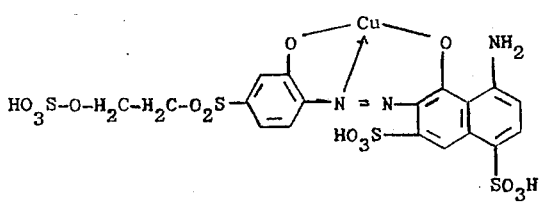

This dyestuff yielded a reddish blue print when printed on cotton fabric in the presence of sodium bicarbonate and subsequently steamed; the prints were fast to light and to washing.

When using 547 parts of the dyestuff of the formula

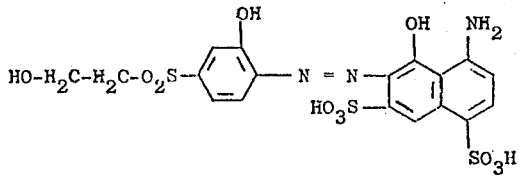

instead of 627 parts of the dyestuff used in the manner as described before in Example 1 and carrying out the process as hereinbefore described, the dyestuff of formula

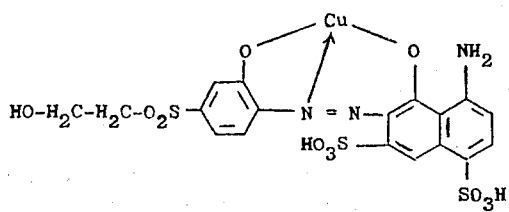

was obtained which yielded on cotton a reddish blue print and could be fixed fast on the fiber in fast manner in the presence of sodium hydroxide.

EXAMPLE 2

60.8 Parts of the dyestuff of formula

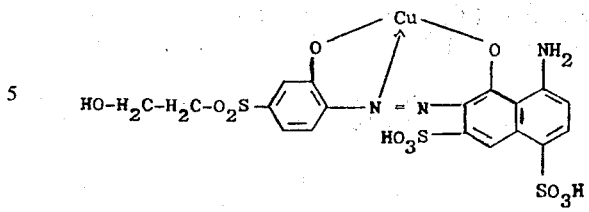

obtained according to the second part of Example 1, were introduced in 400 parts of concentrated sulfuric acid. Subsequently the mixture was stirred at room temperature for 15 hours. The mixture was then poured on about 1,500 parts of ice in a thin jet. 300 Parts of chalk powder were introduced while stirring. The pH was adjusted to 5.5 with a sodium carbonate solution, the mixture was heated to 70° – 80°C and was separated by filtration. The residue was washed with hot water and rejected. The filtrate was vaporized at 60°C in vacuo. The product so obtained was identical with the dyestuff prepared as described in the first part of Example 1.

EXAMPLE 3

250 Parts of crystallized copper sulfate and 80 parts of diethyl amine were added to a neutral solution of 627 parts of the dyestuff of formula

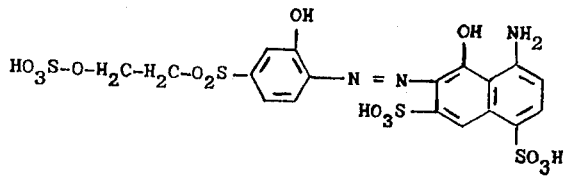

in 8,000 parts of water. After the copper sulfate had completely been dissolved, the pH was adjusted to 12 with about 460 parts of 33% sodium hydroxide solution. The mixture was stirred for 15 hours and the pH was adjusted to 6.5 by adding about 180 parts of 36% hydrochloric acid. The solution obtained was vaporized at 80°C in vacuo. A salt containing black powder was obtained which was dissolved in water giving a blue solution. In the form of the free acid the novel dyestuff was of the formula

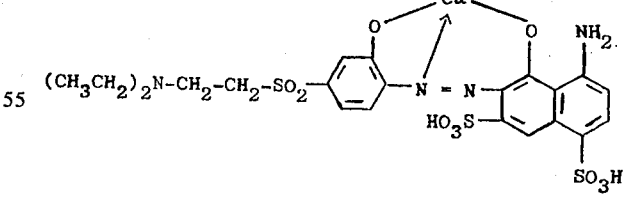

This dyestuff yielded a reddish blue print of very good fastness to light and washing when printed on cotton in the presence of sodium carbonate.

EXAMPLE 4

140 Parts of 33% sodium hydroxide solution were added to a neutral solution of 688.5 parts of the dyestuff of formula

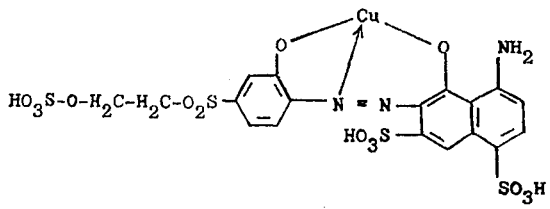

in about 8,000 parts of water while stirring in such a manner that the pH did not exceed 11.5. The mixture was stirred for 15 minutes at a pH 11 to 11.5 and then the pH was adjusted to 5 – 6 with about 30 g of glacial acetic acid. The dyestuff solution so obtained was vaporized at 60°C in vacuo. A black powder was obtained which was dissolved in water giving a blue solution. In the form of the free acid the dyestuff so obtained was of the formula

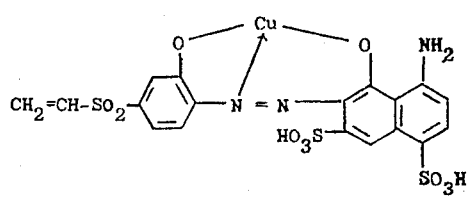

This dyestuff yielded on regenerated cellulose fibers intense, reddish blue dyeings of very good fastness to light and washing in the presence of sodium carbonate.

EXAMPLE 5

30 Parts of sodium acetate and 30 parts of crystallized copper sulfate were added to a solution of 64.1 parts of the dyestuff of formula

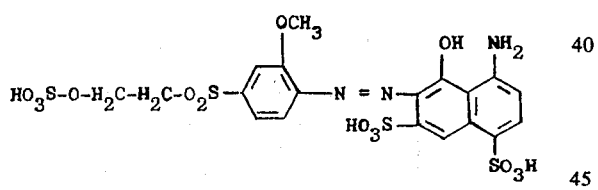

in 1,000 parts of water. The pH was adjusted to 4.5 with a slight amount of glacial acetic acid and the mixture was heated while refluxing for 15 hours. The blue dyestuff solution was subsequently vaporized to dryness at 60°C. The 1:1-copper complex dyestuff obtained in this process was identical with the dyestuff prepared as described in Example 1.

What we claim is:

1. A water soluble copper-complex monoazo dyestuff of the formula

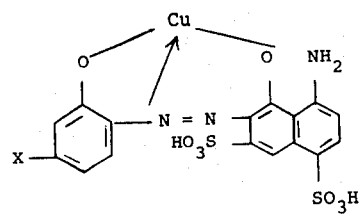

wherein X is
—CH=CH$_2$ or
—SO$_2$ — CH$_2$ — CH$_2$ —Z
in which Z is hydroxy, sulfato, thiosulfato, phosphato, dimethylamino or diethylamino.

2. The dyestuff according to claim 1 of the formula

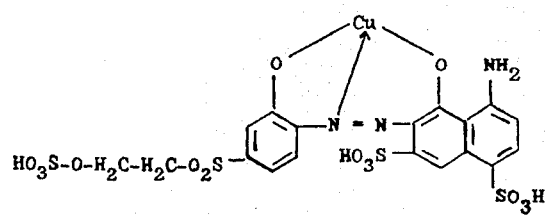

3. The dyestuff according to claim 1 of the formula

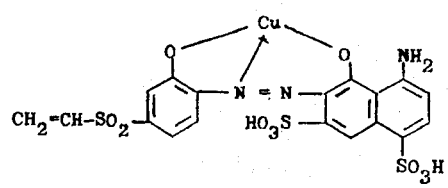

4. The dyestuff according to claim 1 of the formula

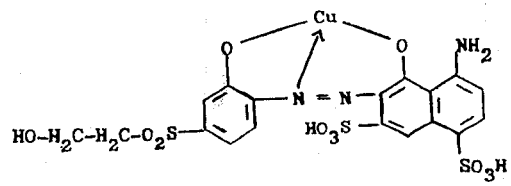

* * * * *